2,867,619

AMINOALKYNYL-N-ALKYLPIPERIDINE CARBOXYLATES

John H. Biel, Milwaukee, Wis., assignor to Lakeside Laboratories, Inc., a corporation of Wisconsin No Drawing. Application November 5, 1956
Serial No. 620,165

7 Claims. (Cl. 260—247.2)

This invention relates to N-substituted piperidine carboxylic acids. More particularly, this invention is concerned with novel aminoalkynyl esters of N-substituted piperidine carboxylic acids and intermediates and processes used to produce such compounds.

According to this invention there are provided disubstituted aminoalkynyl esters of N-substituted piperidine carboxylic acids of the formula

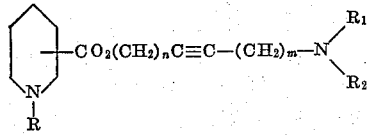

and salts thereof wherein $m$ and $n$ are the same or different integers, especially from 1 through 5, R is a lower alkyl group or monocyclic aryl-lower alkyl group, particularly phenyl alkyl and nuclear substituted phenylalkyl groups, and $R_1$ and $R_2$ are the same or different lower alkyl groups, monocyclic aryl-lower alkyl groups, such as benzyl and phenethyl, lower alkenyl groups, monocyclic aryl groups, such as phenyl, and groups in which $R_1$ and $R_2$ are joined to form a cyclic group with the nitrogen in the ring, particularly heterocyclic groups having 5 or 6 atoms in the ring such as N-pyrrolidino, N-morpholino and N-piperidino.

These compounds (as the tertiary bases) may be conveniently produced by reacting an appropriate haloalkynol of the formula $$X-(CH_2)_m-C\equiv C-(CH_2)_n-OH$$

with a secondary amine of the formula

to produce an intermediate tertiary aminoalkynol of the formula

and subsequently reacting this compound with a lower alkyl ester of an N-substituted piperidine carboxylic acid of the formula

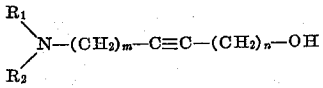

to produce the compounds of the formula

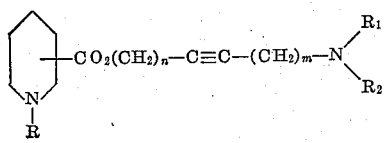

wherein X is a halogen, particularly bromine or chlorine, A is a lower alkyl group, and $m$, $n$, R, $R_1$ and $R_2$ have the significance previously assigned.

The intermediate tertiary aminoalkynols are obtained by reacting a haloalkynol with an excess of the secondary amine in benzene. The reaction mixture is cooled during the initial exothermic reaction. A secondary amine hydrohalide forms and is separated by filtration and the filtrate refluxed to complete the reaction. The product is obtained by fractionally distilling the clarified reaction mixture.

Some of the N-disubstituted aminoalkynols produced in this way from the appropriate reactants are 4-pyrrolidino - 2 - butyn - 1 - ol, 4 - morpholino - 2 - butyn-1 - ol, 4 - piperidino - 2 - butyn - 1 - ol, 4 - dimethylamino - 2 - butyn - 1 - ol, 4 - diethylamino - 2 - butyn-1 - ol, 5 - dibenzylamino - 2 - pentyn - 1 - ol, 6 - morpholino - 3 - hexyn - 1 - ol, 7 - piperidino - 2 - heptyn-1 - ol, 8 - pyrrolidino - 4 - octyn - 1 - ol, 4 - phenethyl-2 - butyn - 1 - ol, 10 - dimethylamino - 5 - decyn - 1 - ol, and the like.

An N-substituted piperidine carboxylic acid ester and an N-disubstituted aminoalkynol may be conveniently reacted in the presence of an inert solvent such as n-heptane or methylcyclohexane to produce the desired end products. A small amount of an alkali metal alkoxide, such as sodium methoxide, is generally added to catalyze the reaction. About equimolar quantities of reactants are preferred to avoid unreacted material after reaction is completed. Elevated temperatures such as the reflux temperature of the mixture are ordinarily used to effect the reaction. The use of an alkyl ester of an N-substituted piperidine carboxylic acid as a reactant results in the formation of the corresponding alcohol as the reaction proceeds. The alcohol distills off at the reflux temperature. After the theoretical amount of alcohol is recovered, the reaction may be considered completed. The desired product is recovered from the reaction mixture by fractional distillation.

Some N-alkylpiperidine carboxylic acids that may be used in this process in the form of esters are N-alkylpipecolinic acid (—COOH in the 2 position), N-alkylnipecotic acid (—COOH in the 3 position), and N-alkylisonipecotic acid (—COOH in the 4 position) wherein the N-alkyl group may be groups such as the methyl, ethyl, propyl, butyl, sec-butyl and other alkyl groups, both saturated and unsaturated and straight and branched chained. In place of the N-alkyl substituent there may be an N-aralkyl group such as N-benzyl, N-phenethyl and the like including such groups in which the phenyl nucleus is otherwise substituted as with a halogen, nitro, or alkoxy group and the like. Lower alkyl esters are preferably used in the reaction.

Representative of the novel compounds which may be produced according to the described process are 4 - dimethylamino - 2 - butynyl N - methyl pipecolinate, 4 - diethylamino - 2 - butynyl N - methyl pipecolinate, 4 - pyrrolidino - 2 - butynyl N - methyl pipecolinate, 4 - piperidino - 2 - butynyl N - methyl pipecolinate, 6 - piperidino - 3 - hexynyl N - benzyl pipecolinate, 8 - pyrrolidino - 4 - octynyl N - phenethyl pipecolinate, 10 - dimethylamino - 5 - decynyl N - propyl pipecolinate and similar compounds from N-substituted nipecotic and isonipecotic acids. Such compounds are high boiling oils.

Acid addition salts of these and other such compounds included within the scope of this invention are produced by contacting such compounds with a suitable acid such as a mineral acid like sulfuric acid or hydrochloric acid, or organic acids like formic acid, citric acid and so on.

Up to two moles of acid may add to a mole of the compound.

Quaternary ammonium salts of the disubstituted aminoalkynyl esters of N-substituted piperidine carboxylic acids are formed by contacting such tertiary amines with alkylating agents, preferably in the presence of a suitable organic solvent. Alkylating agents such as lower alkyl halides, including methyl chloride, ethyl bromide, methyl bromide, alkylating agents like methyl and ethyl sulphate as well as aryl substituted alkylating agents like o-chlorobenzyl bromide, phenethyl chloride and phenylpropyl bromide are representative compounds which may be used to form quaternary ammonium salts of these tertiary bases. These salts are high melting solids.

The non-toxic bis-quaternary ammonium salts of the disubstituted aminoalkynol esters of the N-substituted piperidine carboxylic acids have useful anti-hypertensive and ganglionic blocking activity. These salts may be conveniently administered in the form of essentially pure undiluted compounds if desired, such as in a gelatin capsule. Because such compounds are highly active, however, administrable dosages of the pure compounds ordinarily do not possess a sufficiently large volume to be handled conveniently. Accordingly, pharmaceutical compositions comprising the active compound and a diluent are employed ordinarily. Such compositions may be used as powders, capsules, tablets or solutions.

The following examples are presented to illustrate the preparation of some of the novel compounds included within this invention.

EXAMPLE 1

4-morpholino-2-butyn-1-ol

Into a 500 cc. 3-neck round bottom flask equipped with stirrer, reflux condenser ($CaCl_2$ tube), addition funnel, and heating mantle is placed a solution of 87.0 g. morpholine (1.0 M) in 135 cc. benzene. In a rapid dropwise fashion a solution of 41.8 g. 4-chloro-2-butyn-1-ol (0.4 M) in 75 cc. benzene is added; a vigorous exothermic reaction occurs accompanied by separation of morpholine hydrochloride. The mixture is heated to reflux for 3 hrs. After cooling to room temperature, the crystalline morpholine hydrochloride is filtered off, washed well on the filter with benzene, and the combined benzene filtrates concentrated by vacuum distillation thru a 14″ column. The residue is subjected to vacuum distillation thru a 5″ column. The desired amino alcohol distills as a viscous oil, B. P. 104–106°/0.1 mm. Yield: 56.3 g. or 90.8% of theory.

Analysis.—N, calc. for $C_8H_{13}O_2N$: 9.03%. Found: 9.18%. $N_D^{25}=1.5087$.

EXAMPLE 2

4-morpholino-2-butynyl (N-methyl)-pipecolinate

Into a 500 cc. 3-necked round bottom flask equipped with stirrer, reflux condenser, Dean-Stark water separator, ($CaCl_2$ tube) and heating mantle is placed a solution of 31.4 g. methyl-2-(1-methylpiperidyl) carboxylate (0.2 M) +31.0 g. 4-morpholino-2-butyn-1-ol (0.2 M) in 325 cc. n-heptane. 0.5 g. NaOMe is added, and the mixture refluxed. MeOH, as produced during the transesterification, will separate from the heptane in the water separator. Two additional 0.3 g. portions of NaOMe may be required to catalyze a complete reaction. (The reaction is complete when an amount of heptane insoluble liquid somewhat in xs of the theory has separated.) The reaction mixture is concentrated by slowly distilling off approximately 50% of the heptane. The residue is chilled, filtered, and the balance of the heptane removed by vacuum distillation thru a 14″ column. The residue is subjected to vacuum distillation thru a 3″ column. The desired ester boils 149–151°/0.25 mm.

Yield.—41.6 g. or 74.3% of theory.

Analysis.—N, calc. for $C_{15}H_{24}O_3N_2$: 10.00%. Found: 9.85%. $N_D^{25}=1.5012$.

EXAMPLE 3

The following compounds have also been prepared according to the reaction of Example 2 by selection of the appropriate reactants.

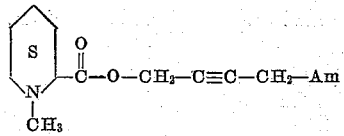

TERTIARY BASIC ESTERS

| Am | Yield, percent | B. P., °/mm. | $N_{D25}$ | Assay—Nitrogen | |
|---|---|---|---|---|---|
| | | | | Calc. | Found |
| $N(CH_3)_2$ | 70.2 | 107–09°/0.35 | 1.4824 | 11.76 | 11.57 |
| $N(C_2H_5)_2$ | 29.5 | 133–35°/0.5 | 1.4824 | 10.53 | 10.41 |
| N⬡ | 70.3 | 138–39°/0.55 | 1.4972 | 10.61 | 10.51 |
| N⬡O | 74.3 | 149–51°/0.25 | 1.5012 | 10.00 | 9.85 |

EXAMPLE 4

4-morpholino-2-butynyl (N-methyl) pipecolinate dimethobromide

To a solution of 14.0 g. 4-morpholino-2-butynyl (N-methyl) pipecolinate (0.05 M) in 80 cc. of iPrOH is added 19.0 g. methyl bromid (0.1 M+100% excess). The mixture is warmed to a gentle reflux, under anhydrous conditions, for 3 hours and then chilled. The solid is filtered off and recrystallized from the minimum amount of hot ethanol to obtain the desired product having a M. P. 208–210° dec.

Yield.—20.8 g. or 88.5% of theory.

Analysis.—N, calc. for $C_{17}H_{30}O_3N_2Br_2$: 5.96%. Found: 5.86%. Br, calc. for $C_{17}H_{30}O_3N_2Br_2$: 34.04%. Found: 34.92%.

EXAMPLE 5

The following quaternary ammonium salts have also been prepared:

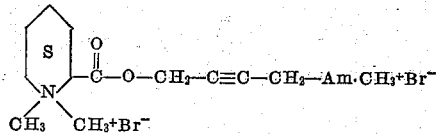

| Am | Yield, percent | M. P., °C. | Assay | | | |
|---|---|---|---|---|---|---|
| | | | Calc. | | Found | |
| | | | Percent nitrogen | Percent halogen | Percent nitrogen | Percent halogen |
| $N(CH_3)_2$ | 95.3 | 193°dec.[a] | 6.54 | 37.38 | 6.42 | 36.90 |
| $N(C_2H_5)_2$ | 60.4 | 204–5°dec.[b] | 6.14 | 35.09 | 6.02 | 34.98 |
| N⬡ | 98.0 | 205°dec.[a] | 6.17 | 35.24 | 6.04 | 36.19 |
| N⬡O | 88.5 | 208–10°dec.[a] | 5.96 | 34.04 | 5.86 | 34.92 |

[a] Recrystallized from EtOH.
[b] Recrystallized from 85:15 iPrOH: EtOH—.

Various changes and modifications of the invention can be made and, to the extent that such variations incorporate the spirit of this invention, they are intended to be included within the scope of the appended claims.

What is claimed is:

1. A member of the group consisting of compounds of the formula

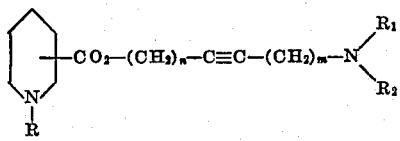

wherein $m$ and $n$ are integers from 1 to 5, R is a member of the group consisting of lower alkyl groups and phenyl-lower alkyl groups, and $R_1$ and $R_2$ are members of the group consisting of lower alkyl groups, phenyl-lower alkyl groups, and groups in which $R_1$ and $R_2$ are joined to each other to form a member of the group consisting of the pyrrolidino, morpholino and piperidino groups, and non-toxic acid addition salts and non-toxic quaternary ammonium salts, said quaternary ammonium salts having a member from the group consisting of lower alkyl and phenyl-lower alkyl groups.

2. 4-morpholino-2-butynyl (N-methyl) pipecolinate.
3. 4-di-lower alkyl amino-2-butynyl (N-lower alkyl) pipecolinate.
4. 4-dimethylamino-2-butynyl (N-methyl) pipecolinate.
5. 4-diethylamino-2-butynyl (N-methyl) pipecolinate.
6. 4-pyrrolidino-2-butynyl (N-methyl) pipecolinate.
7. The process which comprises reacting a compound of the formula

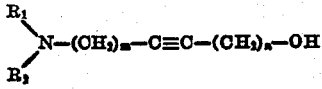

with a compound of the formula

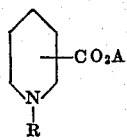

to produce a compound of the formula

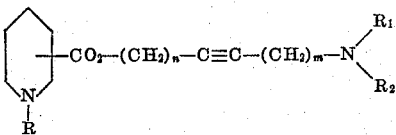

wherein in each occurrence $m$ and $n$ are integers from 1 to 5, A is a lower alkyl group, R is a member of the group consisting of lower alkyl groups and phenyl-lower alkyl groups, and $R_1$ and $R_2$ are members of the group consisting of lower alkyl groups, phenyl-lower alkyl groups, and groups in which $R_1$ and $R_2$ are joined to each other to form a member of the group consisting of the pyrrolidino, morpholino and piperidino groups.

References Cited in the file of this patent

UNITED STATES PATENTS

| | | |
|---|---|---|
| 2,394,770 | Hill et al. | Feb. 12, 1946 |
| 2,708,206 | Girod et al. | May 10, 1955 |
| 2,708,207 | Girod | May 10, 1955 |